US011945132B2

(12) United States Patent
Stachel et al.

(10) Patent No.: US 11,945,132 B2
(45) Date of Patent: Apr. 2, 2024

(54) MULTI-TRACK SLICING MACHINE WITH INDEPENDENTLY CONTROLLABLE GRIPPERS

(71) Applicant: MULTIVAC SEPP HAGGENMUELLER SE & CO. KG, Wolfertschwenden (DE)

(72) Inventors: Tom Stachel, Kempten (DE); Manfred Achenbach, Biedenkopf (DE); David Boettcher, Kempten (DE); Nico Bischof, Legau (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 0 days.

(21) Appl. No.: 17/581,295

(22) Filed: Jan. 21, 2022

(65) Prior Publication Data

US 2022/0234236 A1 Jul. 28, 2022

(30) Foreign Application Priority Data

Jan. 22, 2021 (DE) ......................... 102021101315.1

(51) Int. Cl.
*B26D 7/06* (2006.01)
*B26D 1/143* (2006.01)
*B26D 7/01* (2006.01)

(52) U.S. Cl.
CPC ........... *B26D 7/0633* (2013.01); *B26D 1/143* (2013.01); *B26D 7/01* (2013.01); *B26D* *2210/02* (2013.01)

(58) Field of Classification Search
CPC ................ B26D 7/0633; B26D 7/0625; B26D 2210/02; B26D 7/0608
See application file for complete search history.

(56) References Cited

U.S. PATENT DOCUMENTS

| | | | | |
|---|---|---|---|---|
| 10,639,812 | B2 | 5/2020 | Lindee et al. | |
| 10,751,899 | B2 * | 8/2020 | Lischinski | B26D 1/143 |
| 2017/0259448 | A1 * | 9/2017 | Weber | B26D 7/30 |

FOREIGN PATENT DOCUMENTS

| | | | | |
|---|---|---|---|---|
| DE | 10 2009 039 825 | A1 | 3/2011 | |
| DE | 102009039825 | A1 * | 3/2011 | B26D 7/0608 |
| DE | 10 2015 107 716 | A1 | 11/2016 | |
| DE | 10 2016 112 085 | A1 | 1/2018 | |
| DE | 102016120982 | A1 * | 5/2018 | |
| DE | 20 2011 111 071 | U1 | 3/2019 | |
| DE | 10 2019 123 081 | A1 | 3/2021 | |
| EP | 2420362 | A1 * | 2/2012 | B26D 5/20 |
| EP | 2543485 | A1 * | 1/2013 | B26D 7/00 |
| EP | 3112104 | A1 * | 1/2017 | B26D 7/06 |
| JP | 2004 098 257 | A | 4/2004 | |

(Continued)

OTHER PUBLICATIONS

German Search Report Dated Nov. 29, 2021, Application No. 10 2021 101 315.1, Applicant MULTIVAC Sepp Haggenmueller SE & Co. KG, 7 Pages.

*Primary Examiner* — Jennifer S Matthews
(74) *Attorney, Agent, or Firm* — Brooks Kushman P.C.

(57) ABSTRACT

In order that grippers on individual tracks of a multi-track slicing machine can be moved and controlled independently of one another, they are not all mounted on a same gripper slide guided on the only slide guide present. Instead, at least two slide guides may be present, each of which carries at least one gripper slide, which in turn either carries several grippers or several gripper slides.

18 Claims, 7 Drawing Sheets

(56) References Cited

FOREIGN PATENT DOCUMENTS

| | | | | | |
|---|---|---|---|---|---|
| JP | 2008 173 700 | A | | 7/2008 | |
| JP | 2008173700 | A | * | 7/2008 | ........... B26D 7/0633 |
| WO | WO-2005037501 | A2 | * | 4/2005 | ............... B26D 7/00 |

* cited by examiner

MULTI-TRACK SLICING MACHINE WITH INDEPENDENTLY CONTROLLABLE GRIPPERS

CROSS-REFERENCE TO RELATED APPLICATION

This application claims priority to German Patent Application No. DE 102021101315.1 filed on Jan. 22, 2021, the disclosure of which is incorporated in its entirety by reference herein.

TECHNICAL FIELD

The disclosure relates to slicing machines, in particular so-called slicers, which are used in the food industry to slice strands of an only slightly compressible product such as sausage or cheese.

BACKGROUND

Since these strands can be produced with a cross section that retains its shape and dimensions well over its length, i.e., essentially constant, they are called product calibers.

In most cases, several product calibers arranged parallel to each other are cut at the same time by cutting one slice at a time by the same blade, which moves in a transverse direction to the longitudinal direction of the product calibers.

The product calibers are pushed forward by a feed conveyor of a cutting unit in the direction of the blade of the cutting unit, usually on an obliquely downwardly directed feed conveyor, and are each guided through the product openings of a plate-shaped, so-called cutting frame, at the front end of which the part of the product caliber projecting beyond it is cut off as a slice by the blade directly in front of the cutting frame.

The slices generally fall onto a discharge conveyor of a discharge unit, by means of which they are transported away for further processing.

During slicing, each product caliber is usually held at its rear end facing away from the cutting frame by a gripper, which is provided with corresponding gripper claws for this purpose.

Often, the slicing machines are multi-track machines, which means that the feed unit feeds several adjacent product calibers, each held at the rear end by a gripper, to the cutting unit, which cuts a slice from each of the product calibers, quasi-simultaneously.

The grippers are, as a rule, all attached to a gripper slide running transversely to the feeding direction, which is slidable in the feeding direction, which is why the grippers can essentially only be moved synchronously, and as a rule can only be moved a very small distance in the feeding direction relative to each other, in order to be able to compensate for production inaccuracies of the product calibers with regard to length.

However, this is not sufficient if either calibers of significantly different lengths are to be sliced next to each other on the individual tracks, or if the calibers are to be sliced with different slice thicknesses, since for this the grippers must be able to move by relatively large distances relative to each other in the feed direction.

At the same time, however, drive motors for the grippers on the gripper slide should be avoided in order to keep its moving mass as low as possible.

DETAILED DESCRIPTION

It is therefore the object of the disclosure to provide a slicing machine, in particular a slicer, which is capable of dealing with the above-mentioned problem and at the same time has a high degree of process reliability.

A multi-track slicing machine of the type known in the prior art comprises a cutting unit with a blade for cutting the slices, a discharge unit for discharging the cut slices and a feed unit with a feed conveyor for feeding the product calibers to the cutting unit. The feeding unit has one gripper per track and the grippers, in particular all of them, are carried by a gripper slide which can be moved along a slide guide in a controlled manner in the feeding direction, controlled by a control which controls the moving parts, in particular all the moving parts, of the slicing machine.

In such a slicing machine, the existing object is solved according to the disclosure in that two parallel slide guides are provided and at least one or exactly one gripper slide can be moved along each of them in a controlled manner.

This makes it possible to arrange one slide guide each on the two sides with respect to the infeed conveyor, as seen in plan view, which does not significantly obstruct the view and engagement on the infeed conveyor.

Such slicing machines often have several, e.g., four, tracks next to each other, on each of which a product caliber is fed, from each of which a slice is cut off quasi-simultaneously by only one blade extending in transverse direction over all tracks.

In the case of several, in particular two, slide guides, one possibility is to guide exactly one gripper slide on each slide guide, which can then be identical or only mirror-inverted, but to arrange several grippers on each gripper slide.

In order to be able to move the grippers present on a gripper slide independently of one another, the at least one further gripper is guided in the feed direction relative to the gripper slide carrying it and can be moved in a controlled manner by a limited distance.

Since the drive for such a relative movement is also to be stationary on the slide guide, a drive train must be provided from there to the grippers on the gripper slide.

The other possibility is that a gripper slide carries only one gripper at a time and that several slides are present at each of the slide guides and can be moved in a controlled manner, which then, however, usually cannot overtake each other.

Here, too, the drive sources for the individual gripper slides are preferably all stationary, e.g., at the rear end of the slide guide, as are any stationary gripper activators by means of which the grippers are actuated.

The gripper slides can be moved in the feed direction directly and absolutely relative to the feed unit, or only relative to the other gripper slide guided on the same slide guide, so that one gripper slide, whose position is changed directly relative to the base frame, then acts as master and the other as slave in its displacement in the feed direction.

In both cases, the guides for the slides and/or the gripper slides guided on them and/or the slide drives and/or the gripper drives used can be identical, which reduces the manufacturing effort.

BRIEF DESCRIPTION OF THE DRAWINGS

Embodiments according to the disclosure are described in more detail below by way of example. They show.

DETAILED DESCRIPTION

Figure 1A:
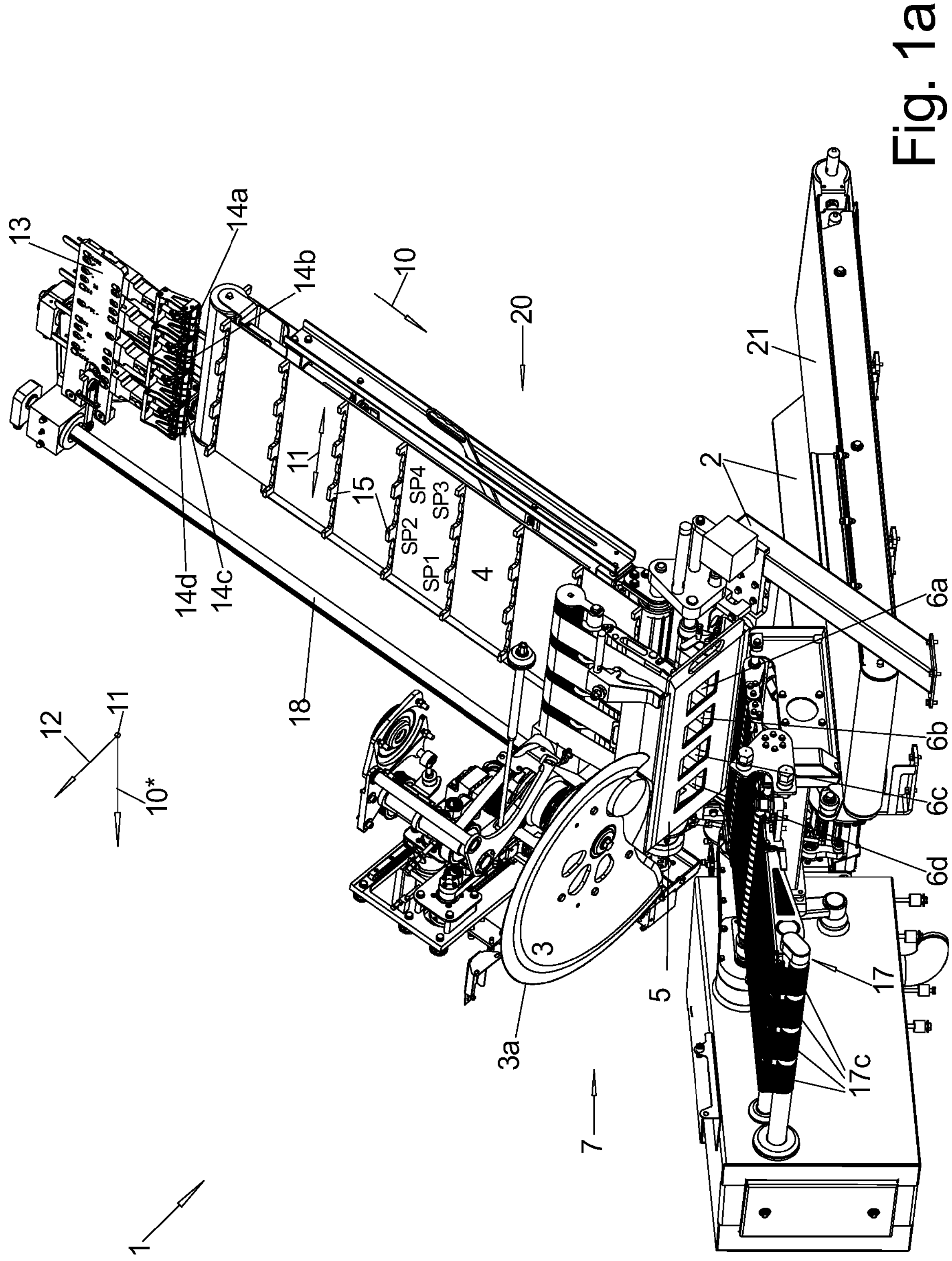
FIGS. 1*a, b*: a slicing machine in the form of a slicer according to the prior art in different perspective views, with the feed belt tilted up into the slicing position.
Figure 1B:
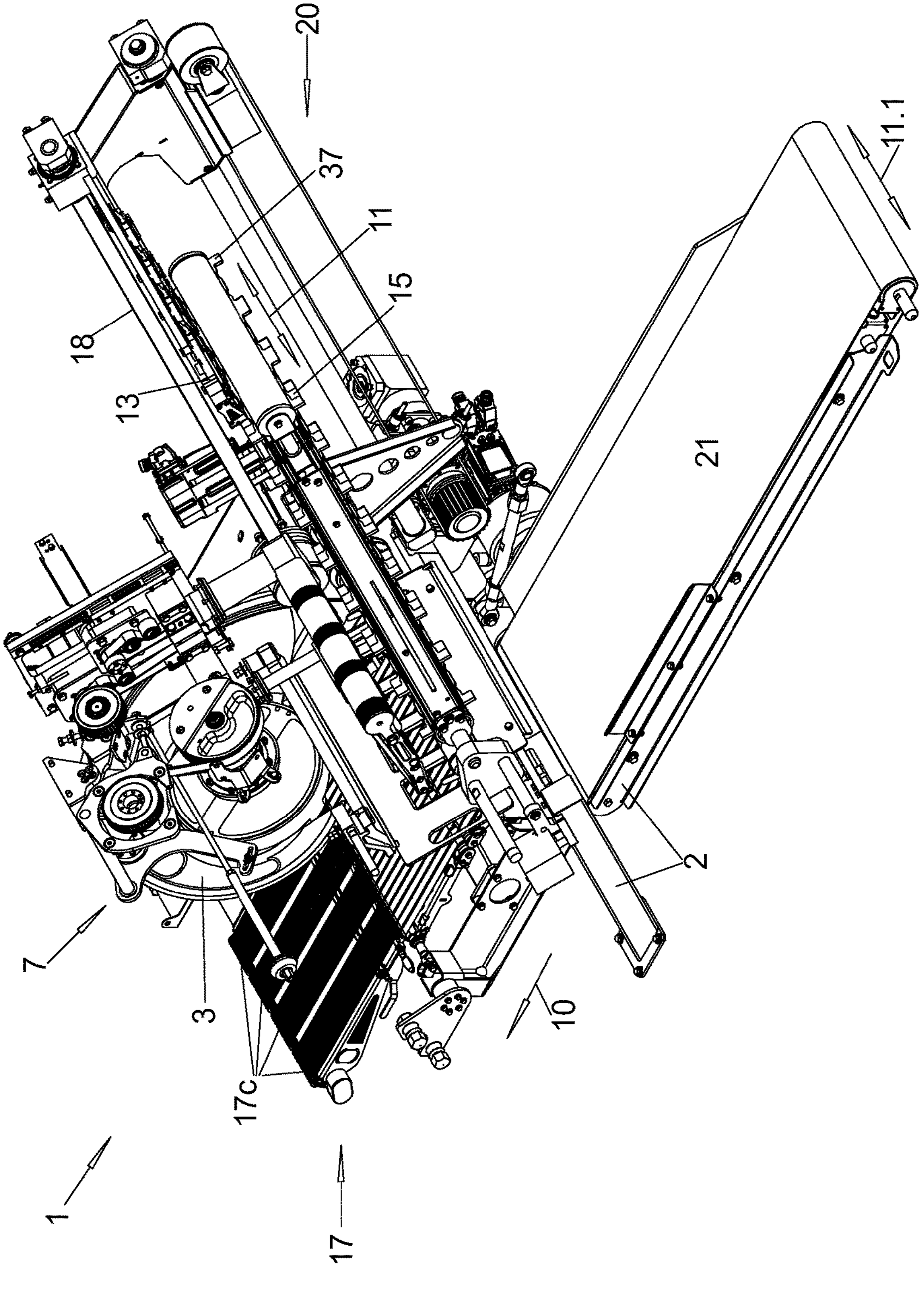
FIG. 1*c*: the slicing machine of FIGS. 1*a, b* in side view with the cover parts removed so that the different conveyor belts are better visible.

FIGS. 1*a*, 1*b* show different perspective views of a multi-track slicer 1 for simultaneous slicing of several product calibers K on tracks SP1 to SP4 next to each other and depositing in shingled portions P of several slices S each with a general passage direction 10* through the slicer 1 from right to left.

Figure 1C:
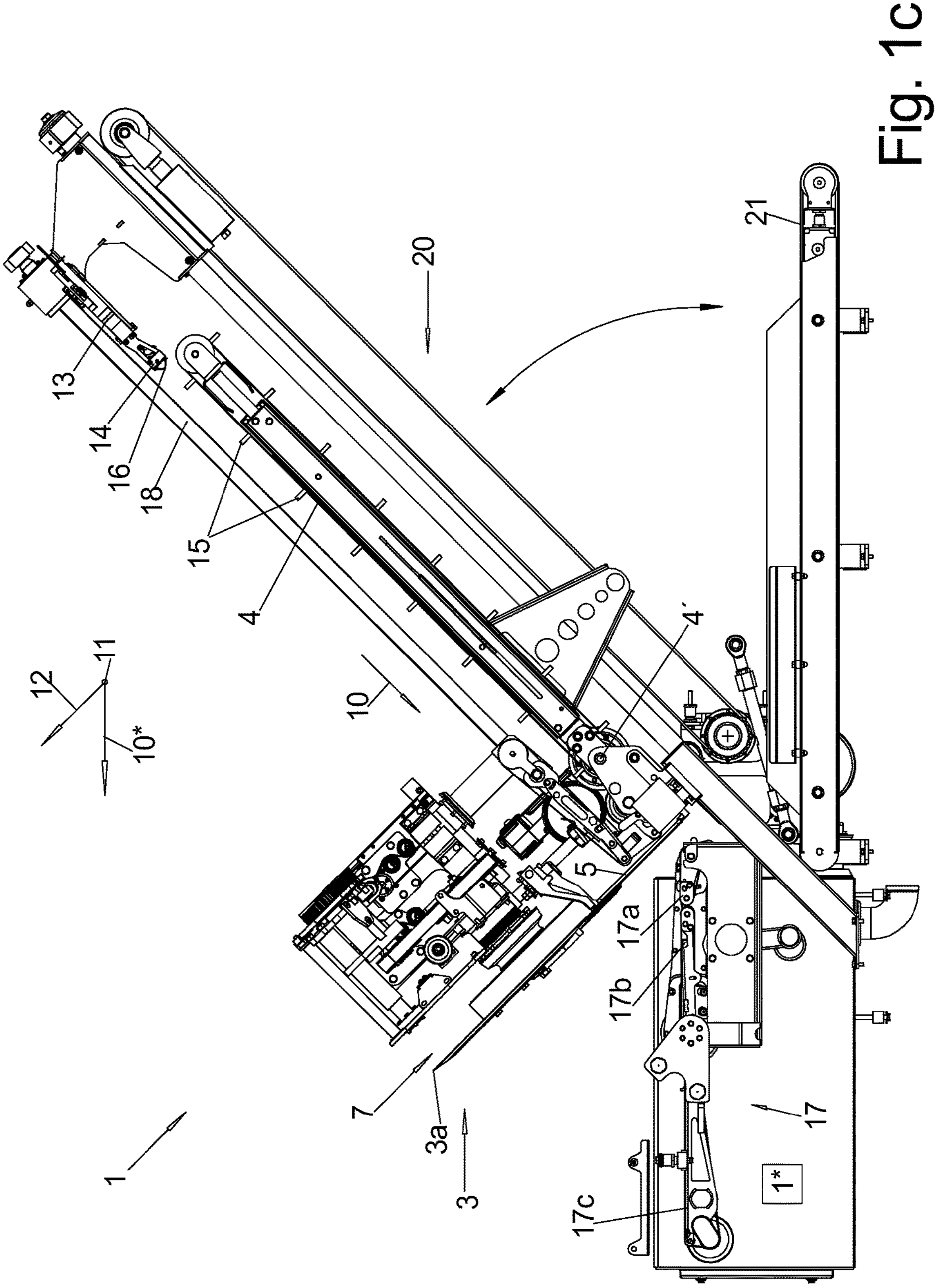
Figure 2A:
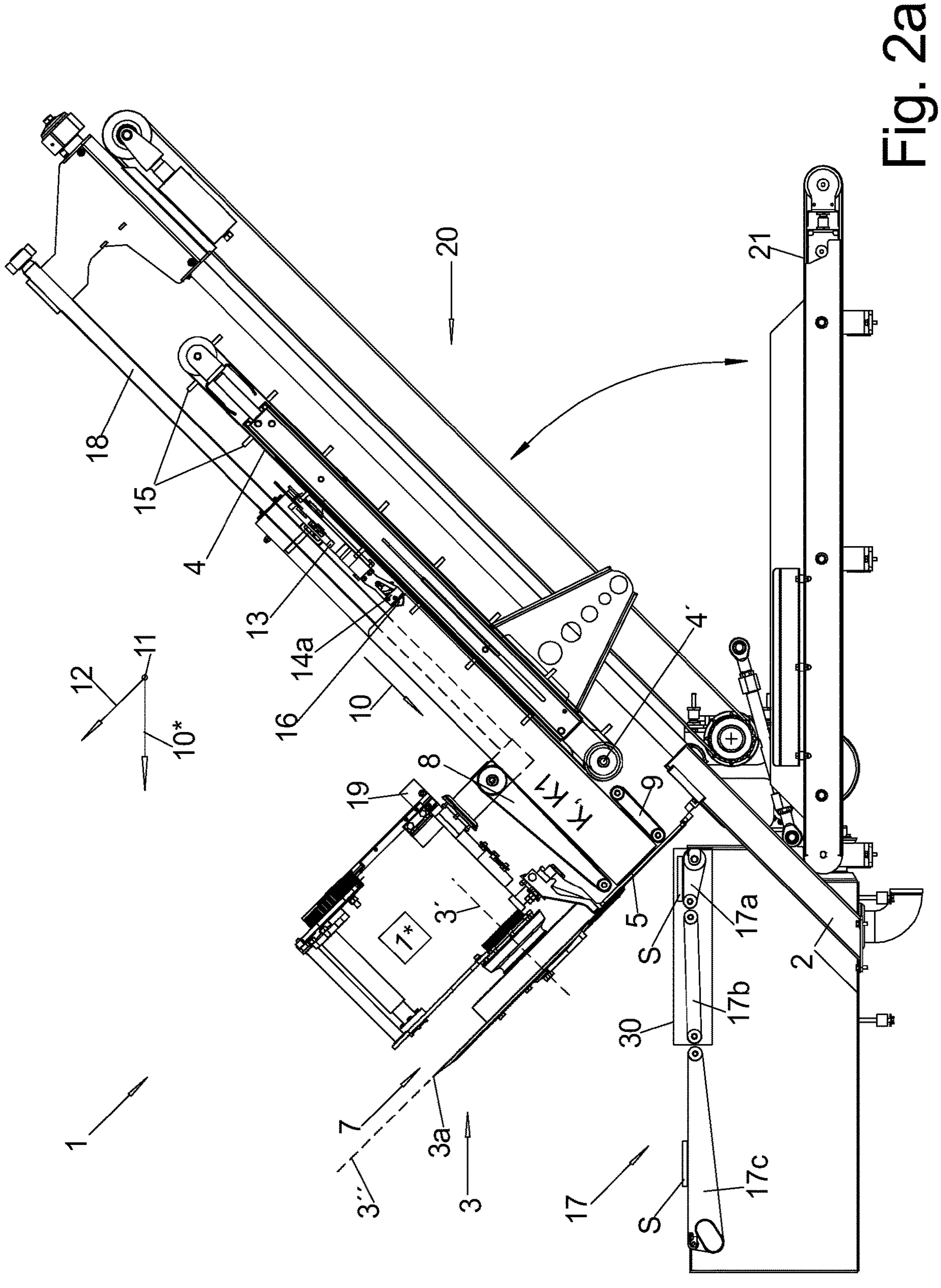
FIG. 2*a*: a simplified side view of the slicing machine compared to FIG. 1*c*, loaded with a caliber of product.

FIG. 1*c* and FIG. 2*a* show—without and with the caliber K inserted—a side view of this slicer 1, omitting covers and other parts not relevant to the disclosure, which are attached to the base frame 2 like all other components, so that the functional parts, especially the conveyor belts, can be seen more clearly. The longitudinal direction 10 is the feed direction of the calibers K to the cutting unit 7 and thus also the longitudinal direction of the calibers K lying in the slicer 1.

It can be seen that the basic structure of a slicer 1 according to the state of the art is that to a cutting unit 7 with a blade 3 rotating about a blade axis 3', such as a sickle blade 3, several, in this case four, product calibers K lying side by side transversely to the feeding direction 10 on a feed conveyor 4 with spacers 15 of the feed conveyor 4 between them are fed by this feed unit 20, from the front ends of which the rotating blade 3 cuts off a slice S with its cutting edge 3*a* in each case in one operation, i.e., almost simultaneously.

Figure 2B:
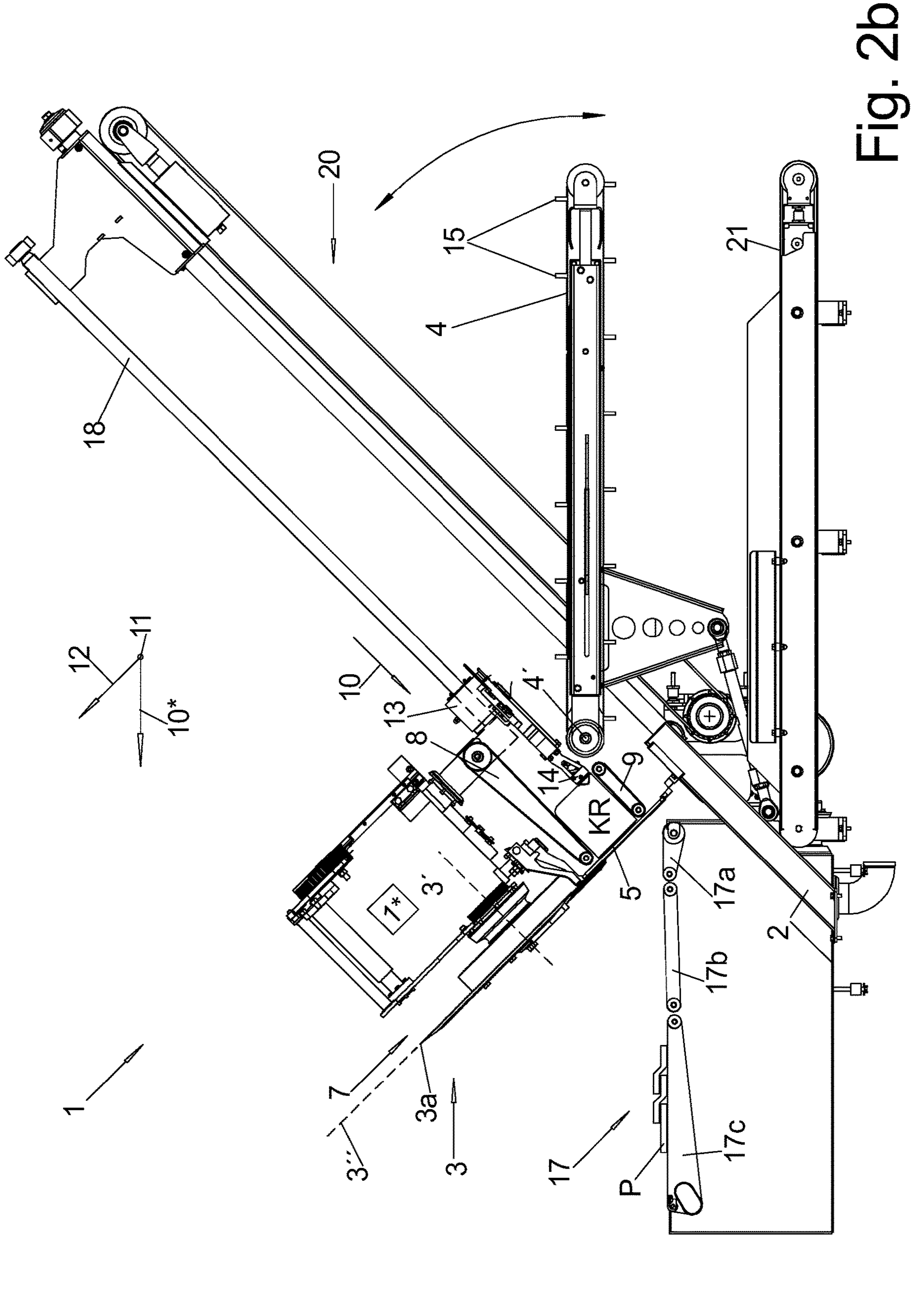
FIG. 2*b*: a side view as in FIG. 2*a*, but with the infeed belt tilted down to the loading position and the product caliber cut except for a caliber rest piece.

For cutting the product calibers K, the feed conveyor 4 is in the cutting position shown in FIGS. 1*a*-2*a*, which is oblique in side view with a low-lying front end on the cutting side and a high-lying rear end, from which it can be tilted down about a pivot axis 20' running in its width direction, the first transverse direction 11, which is located in the vicinity of the cutting unit 7, into an approximately horizontal loading position as shown in FIG. 2*b*.

The rear end of each caliber K lying in the feed unit 20 is held positively by a gripper 14*a-d* with the aid of gripper claws 16 as shown in FIG. 2*a*. These grippers 14*a*-14*d*, which can be activated and deactivated with respect to the position of the gripper claws 16, are attached to a common gripper slide 13, which can be moved along a gripper guide 18 in the feeding direction 10.

Both the feed of the gripper slide 13 and of the feed conveyor 4 can be driven in a controlled manner, but the actual feed speed of the calibers K is effected by a likewise controllably driven so-called upper and lower product guide 8, 9, which engage on the upper side and lower side of the calibers K to be cut in their front end regions near the cutting unit 7.

The front ends of the calibers K are each guided through a so-called product opening 6*a-d* of a plate-shaped cutting frame 5, the cutting plane 3" running immediately in front of the front, obliquely downward-pointing end face of the cutting frame 5, in which cutting plane the blade 3 rotates with its cutting edge 3*a* and thus cuts off the protrusion of the calibers K from the cutting frame 5 as a slice S. The cutting plane 3" runs perpendicular to the upper run of the feed conveyor 4 and/or is spanned by the two transverse directions 11, 12 to the feeding direction 10.

The inner circumference of the product openings 6*a-d* of the cutting edge 3*a* of the blade 3 serves as a counter cutting edge.

Since both product guides 8, 9 can be driven in a controlled manner, in particular independently of one another and/or possibly separately for each track SP1 to SP4, they determine the—continuous or clocked—feed speed of the calibers K through the cutting frame 5.

The upper product guide 8 is displaceable in the second transverse direction 12—which is perpendicular to the surface of the upper run of the infeed conveyor 4—for adaptation to the height H of the caliber K in this direction. Furthermore, at least one of the product guides 8, 9 can be embodied to pivot about one of its deflection rollers in order to be able to change the direction of the run of its belt resting against the caliber K to a limited extent.

The slices S standing obliquely in space during separation fall onto a discharge unit 17 which begins below the cutting frame 5 and runs in the passage direction 10* and which in this case consists of several discharge conveyors 17*a, b, c* arranged one behind the other with their upper runs approximately in alignment in the passage direction 10*, of which the first discharge conveyor 17*a* in the passage direction 10 can be designed as a portioning belt 17*a* and/or one can also be embodied as a weighing unit.

The slices S can hit the discharge conveyor 17 individually and at a distance from each other in the passage direction 10* or, by appropriate control of the portioning belt 17*a* of the discharge conveyor 17—the movement of which, like almost all moving parts, is controlled by the control 1*—form shingled or stacked portions P, by stepwise forward movement of the portioning belt 17*a*.

Below the feed unit 20 there is usually a roughly horizontally running rest piece conveyor 21, which starts with its front end below the cutting frame 5 and directly below or behind the discharge unit 17 and with its upper run thereon—by means of the drive of one of the discharge conveyors 17 against the passage direction 10—transports falling rest pieces downwards.

Figure 3A:
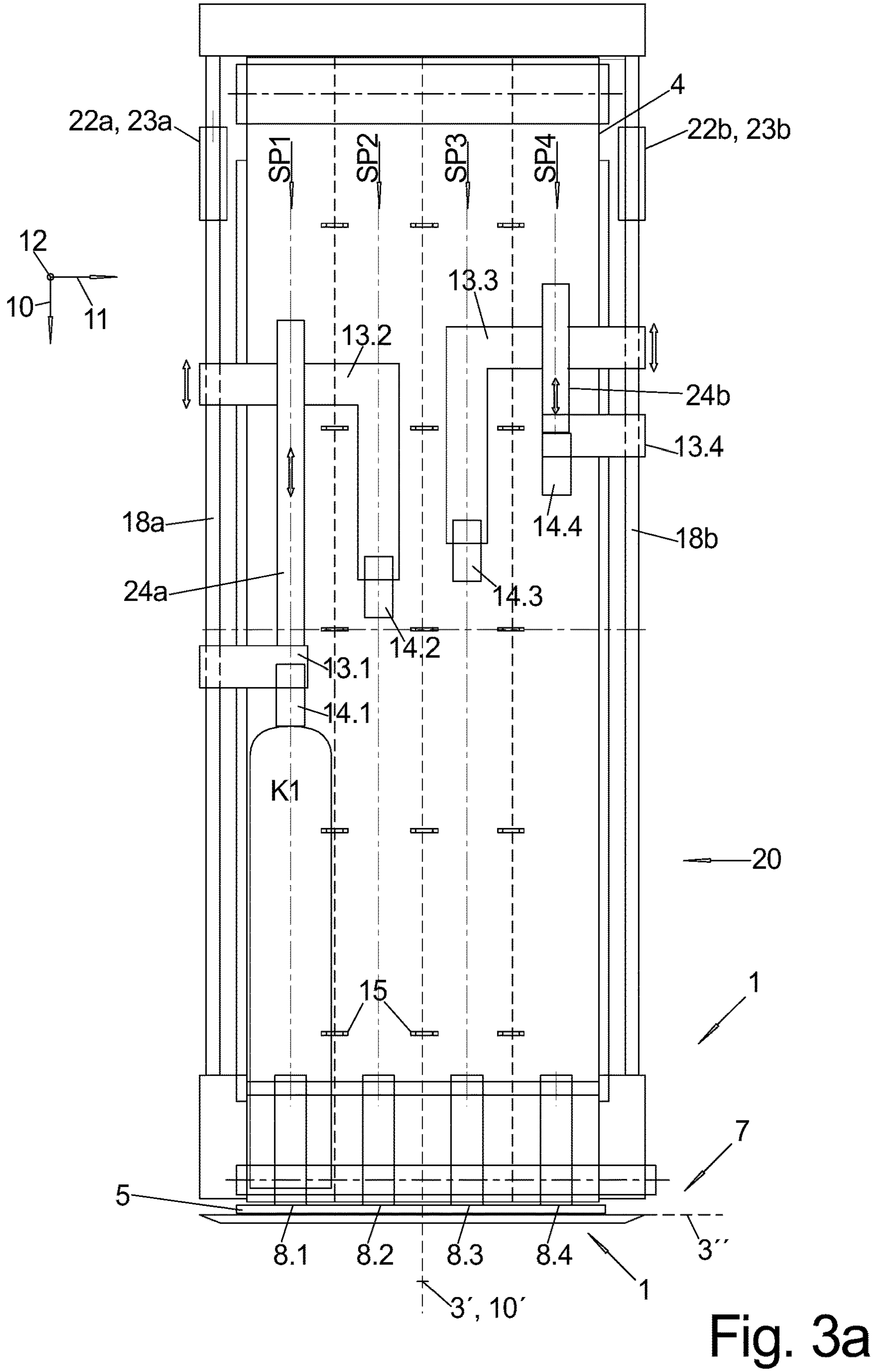
FIG. 3*a*: a first embodiment of the disclosure in the top view of the slicing machine of FIGS. 1*a, b*, viewed perpendicular to the feed belt tilted up into the slicing position.

FIG. 3*a* shows a first embodiment of the drive and the guide of the individual grippers 14.1-14.4 in the feeding direction 10, seen from above, i.e., perpendicular to the feed belt 4 of the feed unit 20:

Here, on both sides of the feed belt 4, in particular symmetrically to the longitudinal center 10' of the feed belt 4, there is a slide guide 18*a*, 18*b* in the form of, for example, a guide rod.

Two gripper slides are guided on each of the two slide guides 18*a, b*, namely the two gripper slides 13.1, 13.2 arranged on this side of the longitudinal center 10' on the slide guide 18*a*, which are guided with their respective guide part on the guide 18*a* at a distance in the feed direction 10.

The guide slide 13.1 carries only one gripper 14.1, which is arranged on the track SP1 and holds the caliber K1 shown there by way of example at its rear end, while the slide 13.2 carries only the gripper 14.2, which can be moved along the track SP2 immediately next to it.

Each of the gripper slides 13.1, 13.2 projects from the slide guide 18*a* only so far in the direction of the longitudinal center 10' that it can carry the gripper 14.1 or 14.2 located on the corresponding track SP1 or SP2.

At the rear end of the slide guide 18*a* facing away from the cutting unit 7, a slide drive source 22*a*—usually a slide motor—for moving each of the gripper slides 13.1, 13.2 in the feeding direction 10 as well as, where appropriate, a gripper activator 23*a* for activating and deactivating each gripper 14.1, 14.2 assigned to this slide guide 18*a*, if the gripper activation does not take place automatically when the caliber, e.g., K1, is contacted by the gripper, e.g., 14.1. In this case, there is preferably a separate slide drive source 22*a* for each slide and a separate gripper activator 23*a* for each gripper for their independent operation.

As with the other embodiments, the decisive factor is that the corresponding drive sources for slides and grippers can be arranged as far away as possible from the cutting unit 7 and, above all, in a fixed position, in order to be able to supply power lines and signal lines to these—not shown—drive sources in a simple manner, which do not have to travel with the slides 13.1 to 13.4.

Thus, by means of the slide drive source 22*a*, each of the two gripper slides 13.1, 13.2 guided on this slide guide 18*a* can be driven independently of each other in the feed direction 10, except for the fact that the two slides 13.1, 13.2 running on this slide guide 18*a* cannot overtake each other.

In this case, the gripper slide 13.1 is arranged with its guide part, with which it engages on the slide guide 18*a*, in front of the slide 13.2 on the slide guide 18*a* in the direction of the cutting unit 7, which is why the other slide 13.2 has at its gripper-side end a support angle pointing in the feeding direction 10, at the front free end of which the gripper 14.2 is held, so that this gripper 14.2 can certainly also assume positions in the feeding direction 10 still in front of the gripper 14.1, the gripper slide 13.1 of which is guided on the same guide 18*a*.

If the slide guide 18*a* is not a guide rod embraced by the guide parts of the slides 13.1, 13.2, individual slide guides, e.g., in the form of guide grooves, can be present on a guide beam on e.g., different sides of its circumference, on each of which one of the gripper slides 13.1, 13.2 can be guided, which can then also overtake each other.

The slide drive train connecting the slide drive source 22*a* to the respective slide can, for example, be embodied integrally with the slide drive source 22*a*, for example in the form of a sliding shaft as a slide guide 18*a*, or, parallel thereto, drive movements can be transmitted along the slide guide 18*a* into the respective gripper slide 13.1, 13.2 guided thereon, and likewise the gripper drive 23*a* in each of the two grippers 14.1, 14.2, in order to be able to operate them independently of one another, i.e., to open and close them.

In order to set the two slides 13.1, 13.2 to a respective predetermined position in the feeding direction 10, one slide, here 13.2, is set as master slide by means of the slide drive to its absolute set position relative to the stationary slide drive source 22*a*, whereas the other slide 13.1, which is assigned to the same slide guide 18*a*, is set as a slave slide only to a predetermined relative nominal position to the slide 13.2 by means of a actuator 24*a*, which is preferably variable in length and is connected to the two slides 13.1, 13.2, again controlled by the slide drive source 22*a*.

The slide drive train for the slave slide thus preferably runs from the corresponding slide drive source 22*a* along or by means of the slide guide 18*a* and through or along the master slide 13.2 to the slave slide 13.1.

It is irrelevant which of the two slides serves as the master and is set to the absolute nominal position in the feeding direction 10 and which serves as the slave, whose relative distance is set only relative to the master.

Nevertheless, both slides 13.1, 13.2 are each guided with their guide part directly on the slide guide 18*a*.

The same applies analogously to the gripper slides 13.3, 13.4 guided on the other side of the longitudinal center 10' on the slide guide 18*b* there and the gripper 14.3, 14.4 held thereon in each case, which are driven by the analogous slide drive source 22*b* and gripper activator 23*b* there.

Figure 3B:
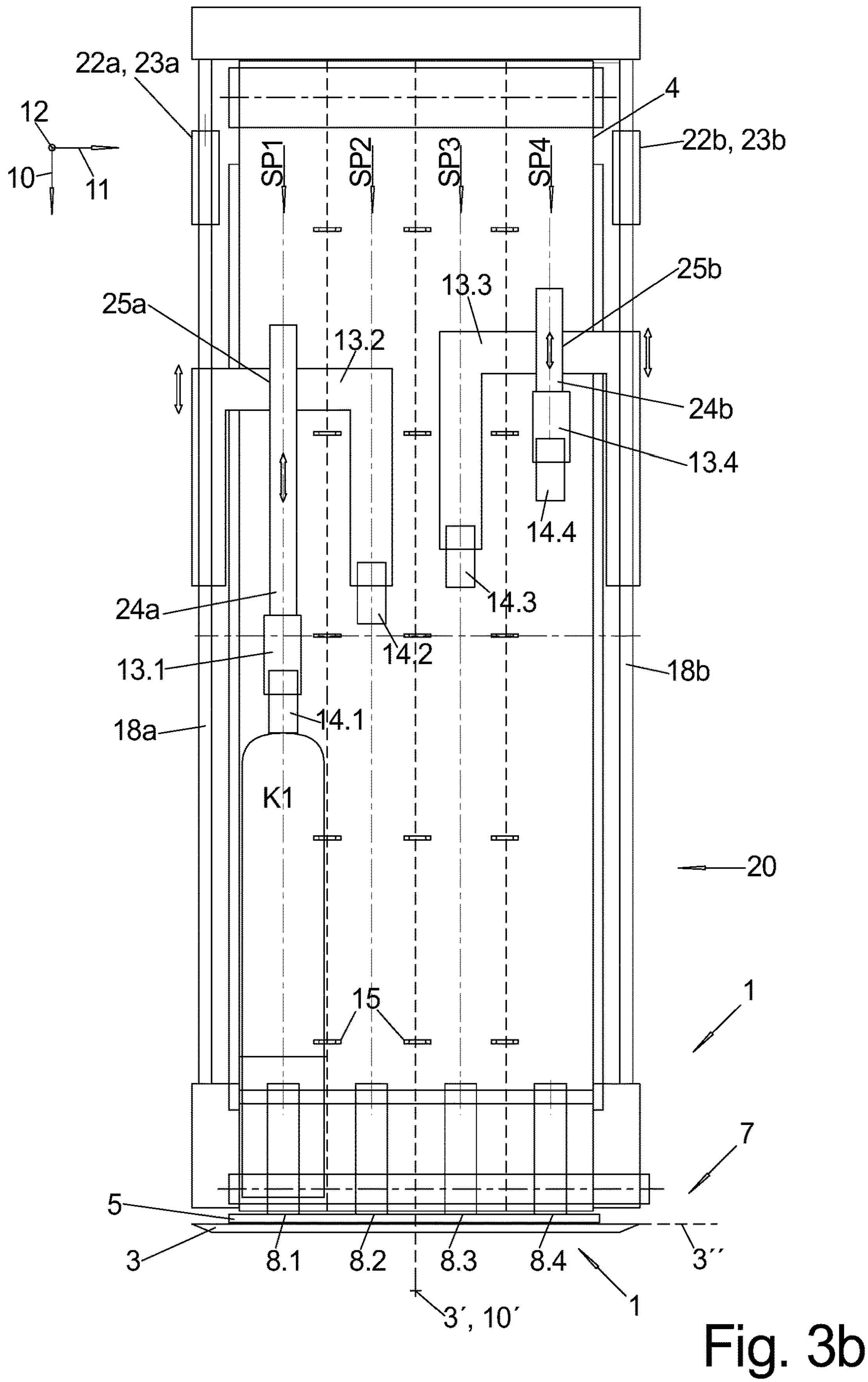
FIG. 3*b*: a second embodiment of the disclosure in a top view of the slicing machine of FIGS. 1*a, b*, viewed perpendicular to the feed belt tilted up into the slicing position.

FIG. 3*b* shows a second solution according to the disclosure.

In contrast to the solution in FIG. 3*a*, only one gripper slide is guided on each of the slide guides 18*a, b*, namely the respective master slide 13.2, 13.3. The respective slave slide 13.1, 13.4, on the other hand, is guided on the respective master slide 13.2, 13.3 by means of a relative guide 25*a*.

The drive lines for the individual gripper slides 13.1-13.4 are preferably designed as explained for FIG. 3*a*.

Thus, also in this case, the actuator 24*a, b* can be controlled from the slide drive source 22*a* via the respective master slide 13.2, 13.3 in order to bring the gripper 14.1 or 14.4 into the desired position.

1 slicing machine, slicer
1* control
2 base frame
3 blade
3 rotation axis
3" blade plane, cutting plane
3*a* cutting edge
4 feed conveyor, feed belt
5 cutting frame
6*a-d* product opening
7 cutting unit
8 upper product guide, upper guide belt
8.1 contact run, lower run
8*a* cutting side deflection roller
8*b* deflection roller facing away from the cutting side
9 bottom product guide, lower guide belt
9.1 contact run, upper run
9*a* cutting side deflection roller
9*b* deflection roller facing away from the cutting side
10 feeding direction, longitudinal direction, axial direction
10' longitudinal center
10* passage direction
11 1. transverse direction (width slicer)
12 2. transverse direction (height-direction caliber)
13.1-13.4 gripper unit, gripper slide
14,14*a-d* gripper
15 spacer
16 gripper claw
17 discharge conveyor unit
17*a, b, c* portioning belt, discharge conveyor
18 slide guide
19 height sensor
20 feed unit
21 end piece conveyor
22*a, b* slide drive
23*a, b* gripper drive
24*a, b* actuator
25*a, b* relative guide
K product, product caliber
KR end piece
S slice
P portion
V packaging element

The invention claimed is:

1. A multi-track slicing machine for slicing product calibers into slices, the slicing machine comprising:

a base frame, a cutting unit, a discharge conveyor for conveying the slices, a feed unit with a feed conveyor for feeding the calibers to the cutting unit comprising:

one gripper per track, multiple gripper slides which carry the grippers, first and second parallel slide guides arranged on opposite sides with respect to a longitudinal center of the feed conveyor, as seen in plan view, wherein the multiple gripper slides include a first gripper slide that is movable in a controlled manner in a feeding direction along the first slide guide, and a second gripper slide that is movable in a controlled manner in the feeding direction along the second slide guide, wherein the multiple gripper slides further include a third gripper slide that is movable with respect to the first slide guide, and a fourth gripper slide that is movable with respect to the second slide guide, and a first actuator connected to the first gripper slide and the third gripper slide, and configured to move the third gripper slide relative to the first gripper slide, and a control for controlling moving parts of the slicing machine.

2. The slicing machine according to claim 1, wherein exactly one gripper slide is movably guided on each slide guide, each gripper slide carries at least two grippers, and at least one of the grippers is guided and displaceable in a controlled manner in the feeding direction relative to the gripper slide carrying it.

3. The slicing machine according to claim 1, wherein a plurality of gripper slides are movable independently of one another in a controlled manner along each slide guide.

4. The slicing machine according to claim 3, wherein each gripper slide carries only one gripper.

5. The slicing machine according to claim 1, wherein each of the gripper slides is movable in a controlled manner relative to the base frame in the feeding direction.

6. The slicing machine according to claim 5, wherein each of the gripper slides is movable in a controlled manner directly relative to the base frame in the feeding direction.

7. The slicing machine according to claim 1, wherein the first and second slide guides are identical and/or the gripper slides guided thereon are identical.

8. The slicing machine according to claim 1, wherein the first and second slide guides are arranged symmetrically with respect to the longitudinal center.

9. The slicing machine according to claim 1, wherein the feed conveyor comprises a feed belt.

10. A multi-track slicing machine for slicing product calibers into slices, the slicing machine comprising:

a cutting unit; and a feed unit with a feed conveyor for feeding the calibers to the cutting unit comprising:

one gripper per track, multiple gripper slides which carry the grippers, first and second parallel slide guides arranged on opposite sides with respect to a longitudinal center of the feed conveyor, as seen in plan view, wherein a first gripper slide of the multiple gripper slides is movable in a controlled manner in a feeding direction along the first slide guide, and a second gripper slide of the multiple gripper slides is movable in a controlled manner in the feeding direction along the second slide guide, wherein the multiple gripper slides include a third gripper slide that is movable with respect to the first slide guide, and a fourth gripper slide that is movable with respect to the second slide guide, and a first actuator connected to the first gripper slide and the third gripper slide, and configured to move the third gripper slide relative to the first gripper slide.

11. The slicing machine according to claim 1, wherein each of the first and third gripper slides is movable independently of each of the second and fourth gripper slides.

12. The slicing machine according to claim 10, wherein the first gripper slide is movable independently of the second gripper slide.

13. The slicing machine according to claim 10, wherein the first gripper slide is spaced away from the second slide guide, and the second gripper slide is spaced away from the first slide guide.

14. The slicing machine according to claim 10, further comprising a second actuator connected to the second gripper slide and the fourth gripper slide, and configured to move the fourth gripper slide relative to the second gripper slide.

15. The slicing machine according to claim 10, wherein the first gripper slide and the third gripper slide are spaced away from the second slide guide, and the second gripper slide and the fourth gripper slide are spaced away from the first slide guide.

16. The slicing machine according to claim 15, further comprising a second actuator connected to the second gripper slide and the fourth gripper slide, wherein the second actuator is configured to move the fourth gripper slide relative to the second gripper slide.

17. A multi-track slicing machine for slicing product calibers into slices, the slicing machine comprising:

a cutting unit; and a feed unit with a feed conveyor for feeding the calibers to the cutting unit comprising:

one gripper per track, multiple gripper slides which carry the grippers, first and second parallel slide guides arranged on opposite sides with respect to a longitudinal center of the feed conveyor, as seen in plan view, wherein a first gripper slide of the multiple gripper slides is movable in a controlled manner in a feeding direction along the first slide guide, and a second gripper slide of the multiple gripper slides is movable in a controlled manner in the feeding direction along the second slide guide, wherein the multiple gripper slides include a third gripper slide that is movable with respect to the first slide guide, and a fourth gripper slide that is movable with respect to the second slide guide, and wherein an actuator connects the first gripper slide and the third gripper slide and is configured to move the third gripper slide relative to the first gripper slide along the first slide guide, the first gripper slide and the third gripper slide are spaced away from the second slide guide, and the second gripper slide and the fourth gripper slide are spaced away from the first slide guide.

18. The slicing machine according to claim 17, wherein the first gripper slide is spaced away from the second slide guide, and the second gripper slide is spaced away from the first slide guide.

* * * * *